(12) United States Patent
Eberlein et al.

(10) Patent No.: US 8,511,700 B1
(45) Date of Patent: Aug. 20, 2013

(54) MASTER DEVICE FOR A CLOSED HYDRAULIC SYSTEM OF HANDLEBAR-STEERED VEHICLES

(71) Applicant: Gustav Magenwirth GmbH & Co. KG, Bad Urach (DE)

(72) Inventors: Hubert Eberlein, Metzingen (DE); Joachim Hujer, Grabenstetten (DE)

(73) Assignee: Gustav Magenwirth GmbH & Co. KG (DE)

( * ) Notice: Subject to any disclaimer, the term of this patent is extended or adjusted under 35 U.S.C. 154(b) by 0 days.

(21) Appl. No.: 13/713,405

(22) Filed: Dec. 13, 2012

Related U.S. Application Data

(62) Division of application No. 13/409,880, filed on Mar. 1, 2012, now Pat. No. 8,398,106.

(51) Int. Cl.
*B62K 21/00* (2006.01)

(52) U.S. Cl.
USPC .......................................... 280/276; 280/279

(58) Field of Classification Search
USPC ................ 280/276, 279, 288.4; 60/585, 533
See application file for complete search history.

(56) References Cited

U.S. PATENT DOCUMENTS

| | | | |
|---|---|---|---|
| 3,771,835 A | 11/1973 | Yabuta | |
| 3,994,533 A | 11/1976 | Ohta | |
| 4,192,224 A | 3/1980 | Okamura | |
| 2012/0096851 A1 | 4/2012 | Lumpkin | |

FOREIGN PATENT DOCUMENTS

| | | |
|---|---|---|
| DE | 200 18 705 | 2/2000 |
| DE | 600 24 598 | 8/2006 |
| DE | 20 2007 007 755 | 8/2007 |
| DE | 10 2006 040 327 | 3/2008 |
| DE | 10 2007 040 293 | 3/2009 |
| DE | 10 2007 040 364 | 3/2009 |
| EP | 0 640 051 | 3/1994 |
| EP | 1 798 126 | 11/2006 |
| EP | 2 096 025 | 2/2009 |

OTHER PUBLICATIONS

International Preliminary Report of PCT/EP2010/062726.

*Primary Examiner* — Tashiana Adams
(74) *Attorney, Agent, or Firm* — Mayback & Hoffman, P.A.; Gregory L. Mayback

(57) ABSTRACT

A master device for a closed hydraulic system of handlebar-steered vehicles includes a basic body and a pressure chamber in which, in the event of actuation of the master device in order to actuate a slave device, hydraulic fluid is placed under pressure. The master device includes a hydraulic line connecting element having a connecting piece for connecting a hydraulic line and a thread section for screwing into the basic body. An air bleed opening bleeds the hydraulic system. The hydraulic line connecting element and the basic body form a valve that closes the connection between the pressure chamber and the air bleed opening when the hydraulic line connecting element is fully screwed in to the basic body.

12 Claims, 5 Drawing Sheets

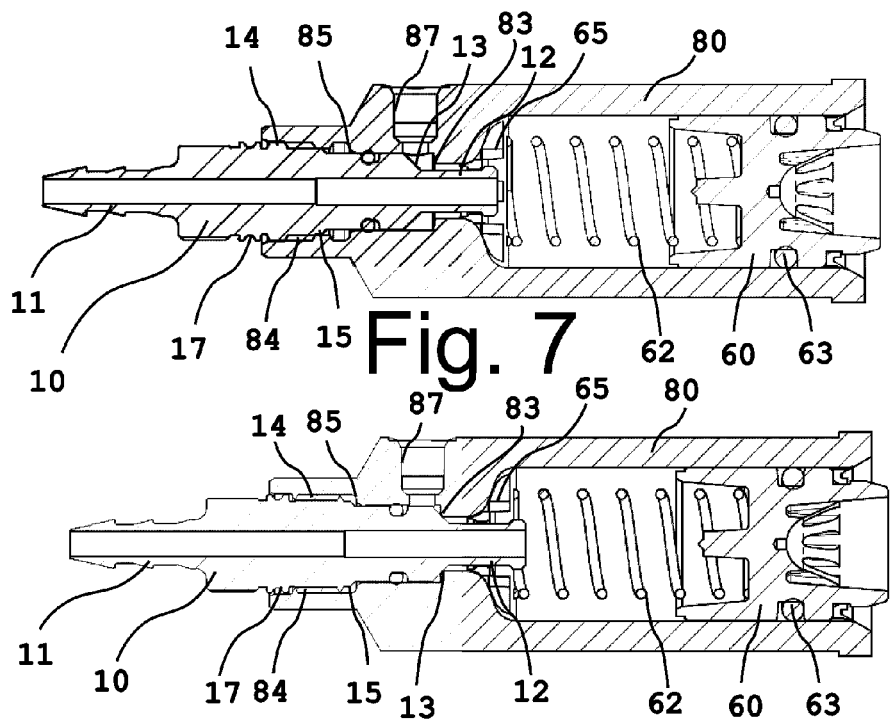
Fig. 7
Fig. 8
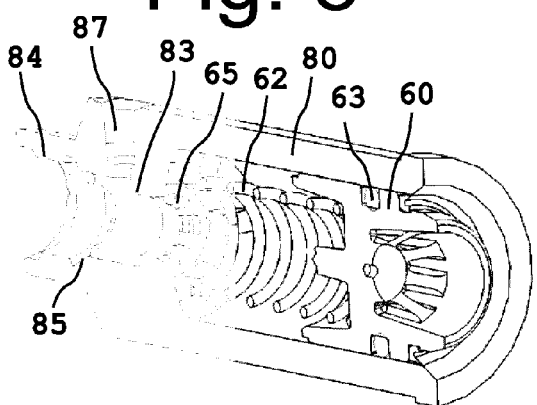
Fig. 9
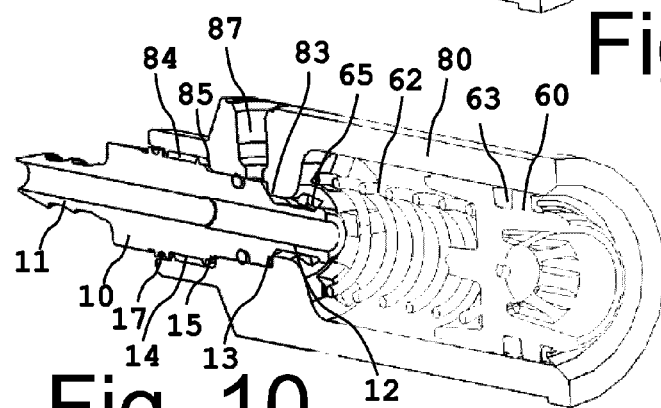
Fig. 10

MASTER DEVICE FOR A CLOSED HYDRAULIC SYSTEM OF HANDLEBAR-STEERED VEHICLES

CROSS-REFERENCE TO RELATED APPLICATIONS

This application is a divisional of U.S. patent application Ser. No. 13/409,880 filed on Mar. 1, 2012 (which application is a continuation-in-part application, under 35 U.S.C. §120, of copending international application No. PCT/EP2010/062726, filed Aug. 31, 2010, which designated the United States and was not published in English and which claims the priority, under 35 U.S.C. §119, of German Patent Application No. 10 2009 039 620.9, filed Sep. 1, 2009), the prior applications are herewith incorporated by reference in their entirety.

STATEMENT REGARDING FEDERALLY SPONSORED RESEARCH OR DEVELOPMENT

Not Applicable

FIELD OF THE INVENTION

The present invention lies in the field of brakes. The present disclosure relates to a master device for a closed hydraulic system of handlebar-steered vehicles. The invention relates to a master device for a closed hydraulic system of handlebar-steered vehicles, in particular, to a master device for a hydraulic brake system or a hydraulic clutch system of handlebar-steered vehicles, and also, in particular, for a bicycle hydraulic brake system.

BACKGROUND OF THE INVENTION

Closed hydraulic systems of said type are known for example from the bicycle rim brake systems from the company Gustav Magenwirth GmbH & Co. KG which is based in Bad Urach, Germany, which closed hydraulic systems are marketed under the designation HS33.

SUMMARY OF THE INVENTION

The invention provides a master device for a closed hydraulic system of handlebar-steered vehicles that overcomes the hereinafore-mentioned disadvantages of the heretofore-known devices and methods of this general type.

In an exemplary embodiment of the invention, a master device for a closed hydraulic system of handlebar-steered vehicles is specified having a pressure chamber in which, in the event of actuation of the master device to actuate a slave device, hydraulic fluid is placed under pressure, a hydraulic line connecting element that has a connecting piece for connecting a hydraulic line and a thread section for screwing into a basic body of the master device, and an air bleed opening for bleeding the hydraulic system. The hydraulic line connecting element and the basic body form a valve that closes the connection between the pressure chamber and the air bleed opening when the hydraulic line connecting element is fully screwed in, and/or the hydraulic line connecting element has a seal surface and the basic body has a seal element, which seal surface and seal element interact with one another such that the pressure chamber is sealed off with respect to the air bleed opening when the hydraulic line connecting element is fully screwed into the basic body, and the pressure chamber is connected to the air bleed opening when the hydraulic line connecting element is disposed in a partially screwed-in position, and/or the hydraulic line connecting element has a seal and the basic body has a seal surface, which seal and seal surface interact with one another such that the pressure chamber is sealed off with respect to the air bleed opening when the hydraulic line connecting element is fully screwed into the basic body, and the pressure chamber is connected to the air bleed opening when the hydraulic line connecting element is arranged in a partially screwed-in position.

Said embodiment of the invention has the advantage that the air bleed opening is automatically closed off when the hydraulic line is connected to the hydraulic line connecting element. To fill or empty the hydraulic system, the hydraulic line connecting element is screwed partially into the basic body and subsequently screwed in fully, such that at the same time the air bleed opening is sealed off by the seal composed of the sealing surface of the hydraulic line connecting element and the sealing element of the basic body. In other words, it could also be said that the hydraulic line connecting element and the basic body form a valve that closes the connection between the pressure chamber and air bleed opening when the hydraulic line connecting element is fully screwed in.

According to the invention, the hydraulic line connecting element may have a collar that abuts against the basic body when the hydraulic line connecting element is fully screwed in.

According to the invention, the hydraulic line connecting element may have a stop and the basic body may have an overload prevention stop against which the stop bears when the hydraulic line connecting element is fully screwed in.

Said embodiment of the invention has the advantage of preventing overtightening of the hydraulic line connecting element because the stop offers a very high resistance against the hydraulic line connecting element being screwed in further.

In said embodiments of the invention, the hydraulic line connecting element is screwed into the basic body. This is an exemplary preferred method of mounting the hydraulic line connecting element in the basic body. The hydraulic line connecting element may self-evidently also be attached to the basic body in some other suitable way. It is important that the method of mounting offers two positions, that is to say, an open position, in which a connection exists between the pressure chamber and air bleed opening, and a closed position, in which the connection between the pressure chamber and air bleed opening is closed off. When seeking alternative mounting techniques, a person skilled in the art will find suggestions, for example, in the field of valves because, by the embodiment of the master device according to the invention, the hydraulic line connecting element interacts with the basic body basically, or in principle, in the manner of a valve.

According to the invention, in the hydraulic line connecting element, a seal that is, in an exemplary embodiment, configured as a colored O-ring may be disposed on that side of the thread section facing away from the pressure chamber.

Here, the seal may be disposed such that it is visible from outside the basic body in the open position (of the valve) and is disposed in the basic body in the closed position (of the valve), such that a visual inspection of the position of the valve is possible during the filling or bleeding of the hydraulic system. Alternatively or in addition, the or a further seal or marking may be provided, which indicates the position of the valve. Alternatively or in addition to the visual inspection, a snap-hook device may be provided, for example, by providing a collar on the end of a projection of the hydraulic line element, which collar engages behind the snap hook, wherein the snap hooks may be provided, for example, in the form of a crown placed into the basic body.

According to the invention, the master device may have an angled outlet or a split outlet. This is advantageous, for example, for a common actuation of front wheel and rear wheel brakes.

According to the invention, an actuation sensor device that senses the actuation of the master device may be provided. Here, the actuation sensor device may have a magnet and a Hall sensor. Alternatively or in addition, other suitable actuation sensor devices may be provided that are known to a person skilled in the art. In brake systems, said embodiments of the invention may be used, for example, to activate a brake light during braking.

According to the invention, a switching and/or display device for actuating and/or displaying the state of a vehicle lighting system, of a suspension characteristic, of an electric drive may be provided. Additional switch actuation measures or state displays are conceivable.

In an alternative embodiment of the invention, which may additionally be formed with the above-stated features of embodiments according to the invention, a master device for a closed hydraulic system of handlebar-steered vehicles is specified, having a fastening device for fastening the master device to a handlebar of the handlebar-steered vehicle, in which the fastening device has a handlebar fastening section for receiving the handlebar tube of the handlebar-steered vehicle, which handlebar fastening section encloses a circumferential section of the handlebar tube of more than 180°, in an exemplary embodiment, of more than 181°, in particular, of more than 182°, and, preferably, of approximately 185°.

Said embodiment of the invention has the advantage that the mounting of the master device on the handlebar tube of the handlebar-steered vehicle can be carried out very easily. For mounting, the fastening section simply can be plugged onto the handlebar tube because the fastening section offers a certain amount of hold as a result of the fact that it encloses the handlebar tube by slightly more than 180°. The master device may subsequently be fixed by suitable measures. For example, a clamp having, for example, two screws may be attached to the fastening section such that the fastening section, together with the clamp, fully encloses the handlebar tube, and is clamped onto the latter as a result of the tightening of the screws.

According to the invention, the fastening device may have a clamp that interacts with the fastening section such that the fastening section, together with the clamp, encloses the handlebar tube of the handlebar-steered vehicle.

According to the invention, the master device may have a master housing in which are disposed a hydraulic cylinder and a piston movable therein with respect to a pressure chamber, with the thrust piece having a rotary bearing receptacle for receiving a bearing journal.

According to said features of the invention, the lever may be rotatably mounted on the master housing via the thrust piece.

According to the invention, the basic body (as a functional part) may be constructed in the manner of a skeleton or frame, while the covering hood (as a design part), which is in the field of vision, may be produced so as to be visually more appealing.

According to the invention, the covering hood may secure and/or cover the bearing journal for the thrust piece.

According to the invention, the bearing journal may be secured in the covering hood or the basic body by a snap-action mechanism. To be able to exchange the lever, the bearing journal may be configured to be removable.

According to the invention, the grommet may provide an anti-kink facility for the hydraulic line.

According to the invention, the covering hood may be pivotable on the basic body. This has the advantage that the lever and/or the covering hood can be exchanged more easily.

According to the invention, the covering hood may be configured as a driving direction indicating device (turn indicator) and/or vehicle lighting system. A cornering light could, for example, be provided.

According to the invention, a exemplary automatic brake light switch/motor switch (deactivation of an electric motor during braking) may be integrated in the basic body and/or the covering hood. Here, a Hall sensor or a reed contact may be provided as a switch element, for example, to detect the actuation of the master device.

According to the invention, a switching and/or display device may be provided on the basic body and/or on the covering hood. For example, a wear display or a wear indicator may be provided. Here, a sensor for detecting the wear for example of the brake linings or of the clutch linings may be provided.

The embodiments of the invention without a separate air bleed opening to be closed off, that is to say, in which the hydraulic line element automatically closes off the air bleed bore during the mounting process, have the advantage that they may have right/left symmetry, such that production costs can be saved because it is not necessary to develop and produce different master devices for the left-hand and right-hand sides.

According to the invention, the covering hood may be formed from any desired material, for example, from plastic and/or metal and/or carbon and/or ceramic and/or wood or a combination of these materials.

The known master devices of closed hydraulic systems have a grip span adjusting device to be able to adjust the distance between the lever and handlebar tube to match the size of the hand of the rider.

A disadvantage of the known master devices is that, during adjustment of the grip span, the zero position of the piston in the cylinder of the master device is adjusted, as a result, after the adjustment of the grip span has taken place, the play between the brake linings and the wheel rim must subsequently be adjusted.

Furthermore, in the known master devices of closed hydraulic systems, the angle between the force transmission element, which in the event of an actuation of the master device transmits the force from the lever to the piston via a thrust piece, and the piston is changed during an adjustment of the grip span. The optimum angle of engagement may, for example, be set for an average grip span. A disadvantage is, however, that, for an optimum angle of engagement, different models for different grip spans must be produced at the factory. Otherwise, a non-optimum engagement angle would be generated in the event of extreme grip spans being set. Furthermore, there is the disadvantage that the master device cannot be adapted optimally to other grip spans at a later point in time.

Therefore, the present invention is based on specifying a master device for closed hydraulic systems of handlebar-steered vehicles, the grip span of which master device can be adjusted easily, independently of the position of the piston and independently of the optimum angle of engagement of the force transmission to the piston.

The invention achieves this with a master device for a closed hydraulic system of handlebar-steered vehicles according to the invention.

According to one embodiment of the invention, which may additionally be formed with the above-stated features of embodiments according to the invention, a master device for a closed hydraulic system of handlebar-steered vehicles is specified, having a pressure chamber in which, in the event of actuation of the master device in order to actuate a slave device, hydraulic fluid is placed under pressure, a lever for actuating the master device, a grip span adjusting device for adjusting the grip span, a thrust piece for the rotatable mounting of the lever on the master device, and a pressure point adjusting and/or braking and/or clutch lining adjusting device for adjusting the pressure point and/or for compensating lining wear, wherein the lever is arranged so as to be pivotable relative to the thrust piece, with it being possible for the angle between the lever and the thrust piece to be adjusted by means of the grip span adjusting device, and wherein the pressure point adjusting and/or brake or clutch lining adjusting device is designed such that the spacing between the thrust piece and the pressure chamber can be adjusted by means of the pressure point adjusting and/or brake or clutch lining adjusting device.

Said embodiment according to the invention has the advantage that the grip span adjustment can take place independently of the pressure point adjustment because the grip span can be set by the angle between the lever and the thrust piece. The position of the thrust piece thus remains unchanged during the adjustment of the grip span. Because the position of the thrust piece defines the angle of engagement of the force transmission components for transmitting force from the thrust piece to the piston during the actuation of the master device, the force transmission including the angle of engagement can be set optimally independently of the grip span.

Therefore, the master devices according to the invention also have the advantage that different variants need not be produced for different grip spans in order to obtain an optimum transmission of force in relation to the angle of engagement of the force transmission components.

Within the context of the present invention, the grip span means, in particular, the distance from that region of the lever on which the rider normally acts with his fingers in order to actuate the master device to the handlebar tube of the handlebar of the handlebar-steered vehicle to which the master device is attached. The distance may, for example, be determined by the perpendicular from the region of the lever to the handlebar tube.

According to the invention, the grip span adjusting device may have a bolt with a stop section that interacts with a corresponding stop section formed on the thrust piece.

Here, according to the invention, the bolt may have an external thread and may be disposed in an internal thread of the lever so as to be adjustable along the longitudinal axis thereof by being rotated.

By rotating the bolt in the internal thread of the lever, it is therefore possible to vary the position of the stop section of the bolt relative to the lever. Because the stop section of the bolt is supported on a corresponding stop section formed on the thrust piece, it is possible, in this way, to set the angle between the lever and the thrust piece and, therefore, the grip span, without changing the position of the thrust piece in relation to the piston of the master device.

According to the invention, the grip span adjusting device may have an engagement section for the engagement of a tool for adjusting the grip span. Here, according to the invention, the engagement section for the engagement of a tool for adjusting the grip span may be formed in the bolt.

According to the invention, the engagement section may, in an exemplary embodiment, be configured as a hexagonal socket or as some other engagement section that is compatible with common or specially designed tools.

According to the invention, the grip span adjusting device may have a preload device that preloads the lever along the pivoting path in the direction of the thrust piece. Here, the preloading imparted by the preload device may be such that the stop section of the bolt is preloaded in the direction of the stop section of the thrust piece.

According to the invention, the master device may have a pressure point adjusting and/or brake or clutch lining adjusting device that, in an exemplary embodiment, has a bolt that is held in a receptacle of the thrust piece, with the relative position of the bolt in the receptacle being adjustable. Here, the bolt may be a threaded bolt rotatably disposed in a rotary receptacle that is rotatably disposed in the receptacle of the thrust piece.

The invention, therefore, also relates to a hydraulic brake and/or hydraulic bicycle brake and/or hydraulic bicycle wheel rim brake and/or hydraulic bicycle disc brake and/or hydraulic clutch and/or hydraulic electric bicycle brake and/or bicycle and/or electric bicycle and/or motorcycle having at least one master device according to the invention. Here, the master device according to the invention may have a grip span adjusting device that is independent, in terms of adjustability, of a wear adjusting device and/or pressure point adjusting device, which are, in an exemplary embodiment, connected to one another by a common thrust piece. For example, the lever of the master device may be formed in two parts from a lever element and a thrust piece element, with the thrust piece being supported on the basic body and/or housing of the master device, and with the lever element being pivotable relative to the thrust piece such that, after an angle between the lever element and thrust piece has been set, the lever element can be rotated together with the thrust piece about a common center of rotation like a normal lever in order to actuate the master device (in such a way that the lever is moved in the direction of the handlebar tube). Furthermore, one end of the wear adjusting device and/or pressure point adjusting device is articulatedly connected to the thrust piece. Because the position of the thrust piece is not changed during the grip span adjustment, the setting of the position of the lining (for example, brake lining or clutch lining) and/or of the pressure point of the hydraulic system is not changed during an adjustment of the grip span. The respective adjustments may, therefore, be carried out independently of one another.

Although the invention is illustrated and described herein as embodied in a master device for a closed hydraulic system of handlebar-steered vehicles, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 7 is a longitudinal, cross-sectional view of the embodiment of FIG. 1 of the basic body with a hydraulic line connecting element partially screwed in;

FIG. 8 is a longitudinal, cross-sectional view of the embodiment from FIG. 1 of the basic body with a hydraulic line connecting element fully screwed in;

FIG. 9 is a perspective, longitudinal cross-sectional view of the embodiment from FIG. 1 of the basic body without a hydraulic line connecting element;

FIG. 10 is a perspective, longitudinal cross-sectional view of the embodiment from FIG. 1 of the basic body with a hydraulic line connecting element fully screwed in;

FIG. 11 is a fragmentary, longitudinal, cross-sectional view of an alternative exemplary embodiment of the invention corresponding to the embodiment of FIG. 7 with the basic body having a hydraulic line connecting element partially screwed in; and FIG. 12 is a fragmentary, longitudinal, cross-sectional view an alternative exemplary embodiment of the invention corresponding to the embodiment of FIG. 8 with the basic body is illustrated with a hydraulic line connecting element fully screwed in.

DETAILED DESCRIPTION OF THE INVENTION

Figure 1:
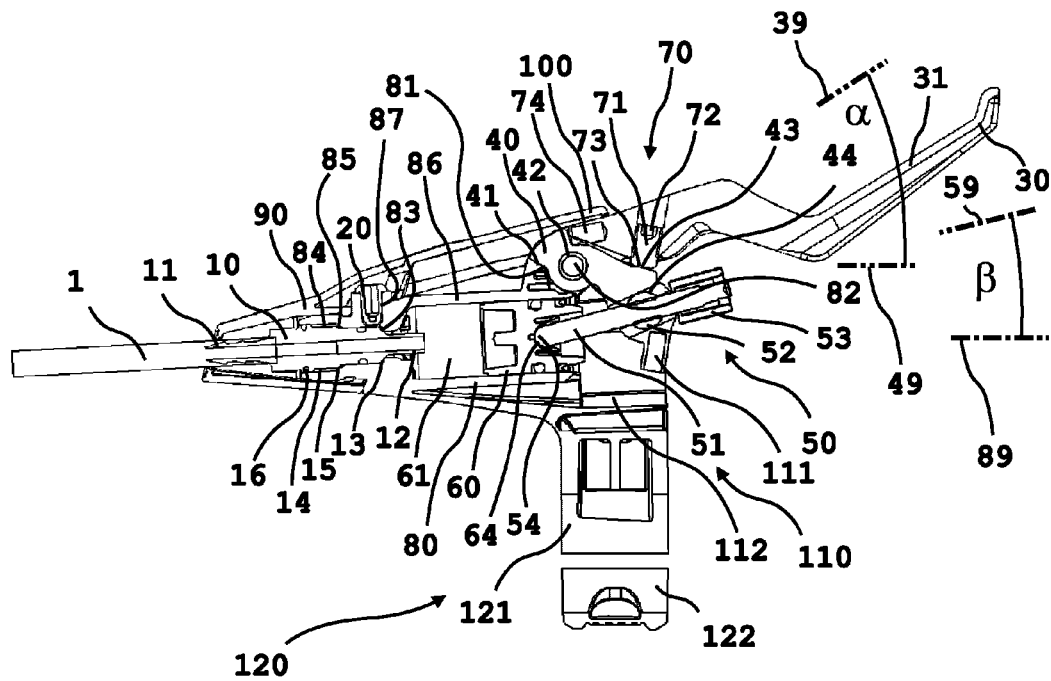
FIG. 1 is a cross-sectional view of a master device of a hydraulic brake system of handlebar-steered vehicles according to a first exemplary embodiment of the invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

In the description of the exemplary embodiments, the following reference symbols are used:
1 Hydraulic line
10 Line connecting element
11 Connecting piece
12 Projection
13 Seal surface
14 Thread section (external thread)
15 Stop
16 Seal (O-ring, preferably colored)
17 Groove
20 Closure element
30 Lever
31 Actuating section
39 Direction of the lever
40 Thrust piece
41 Stop
42 Rotary bearing receptacle
43 Stop section (for bolt 71 of the grip span adjusting device)
44 Receptacle for pressure point adjusting and/or brake or clutch lining adjusting device
49 Direction of the thrust piece (in this case, by way of example, parallel to the direction of the handlebar tube)
50 Pressure point adjusting and/or brake or clutch lining adjusting device
51 Threaded bolt
52 Rotary receptacle with internal thread for threaded bolt 51
53 Rotary head
54 Threaded bolt head
59 Direction of the bolt
60 Piston
61 Pressure chamber
62 Restoring spring
63 Seal
64 Bolt receptacle (for threaded bolt head 54)
65 Crown or travel delimitation
70 Grip span adjusting device
71 Bolt
72 Engagement section (preferably hexagonal socket)
73 Stop section
74 Preload device
80 Basic body
81 Thrust piece stop
82 Bearing journal (for thrust piece)
83 Seal element
84 Thread section (internal thread for receiving the line connecting element)
85 Overload prevention stop
86 Hydraulic cylinder
87 Air bleed opening
89 Direction of the hydraulic cylinder
90 Grommet
100 Covering hood
101 Rotary joint
102 Snap-action fastening element
110 Actuating sensor device
111 Magnet
112 Hall sensor
120 Fastening device
121 Handlebar tube fastening section
122 Clamp
130 Combined switching and display device
210 Line connecting element
211 Connecting piece
212 Projection
213 Seal (for example O-ring)
214 Thread section (external thread)
215 Stop
218 Collar
260 Piston
261 Pressure chamber
262 Restoring spring
263 Seal
264 Bolt receptacle (for threaded bolt head)
265 Crown or travel delimitation
280 Basic body
283 Seal surface
284 Thread section (internal thread for receiving the line connecting element 210)
285 Overload prevention stop
286 Hydraulic cylinder
287 Air bleed opening
α Angle between lever 30 and thrust piece 40 in relation to an axis of rotation about bearing journal 82
β Angle between bolt 51 and hydraulic cylinder 86 in relation to the point of engagement of the threaded bolt head 54 on the bolt receptacle 64 of the piston 60

Described now are exemplary embodiments of the present invention. Referring now to the figures of the drawings in detail and first, particularly to FIGS. 1 and 2, there is shown a first exemplary embodiment of a master device for a hydraulic brake system of handlebar-steered vehicles according to a first embodiment of the invention.

The master device has a basic body 80 which defines a hydraulic cylinder 86 in which are disposed a pressure chamber 61 and a piston 60, which is mounted in said pressure chamber in a movable manner and which, in a known way, is sealed off with respect to the hydraulic cylinder 86 by a seal 63.

Connected to the master device is a hydraulic line 1, which is connected to a slave device (not illustrated). The slave device may, for example, be a brake cylinder of a hydraulic bicycle wheel rim brake. A brake caliper of a hydraulic bicycle disc brake and/or motorcycle disc brake would also be conceivable. Alternatively, the slave device could also be a part of a hydraulic clutch system.

The hydraulic line 1 is connected to the master device by a line connecting element 10 which has a connecting piece 11 onto which the hydraulic line 1 is pressed. The line connecting element 10 also has a thread section 14 with an external thread, by which the line connecting element 10 is screwed into a corresponding thread section 84, which has an internal thread for receiving the line connecting element 10, of the basic body 80. The thread section 14 of the line connecting element is adjoined by a stop 15, which interacts with an overload prevention stop 85 to prevent the line connecting element 10 from being screwed too far into the basic body 80.

A preferably colored O-ring 16 is provided in a groove of the line connecting element 10, which O-ring firstly provides sealing with respect to hydraulic fluid and secondly makes it possible to confirm by visual inspection that the line connecting element has been screwed sufficiently far into the basic body 80, this being the case when the colored O-ring is no longer visible because it is hidden by the basic body 80.

On a projection 12, the line connecting element 10 has a seal surface 13 which interacts with a seal element 83 of the basic body in order to seal off the line connecting element 10, which protrudes with the projection 12 into the basic body 80. For this purpose, the seal element 83 is elastically deformed as a result of the engagement with the seal surface 13.

The basic body 80 may, in an exemplary embodiment, be formed from a plastic or a suitable metal. A combination of different materials is conceivable. The plastic may have polyamides. A fiber content of up to 50% is conceivable. Normally, the fiber content should be less than 30%. Glass fibers and/or carbon fibers may, for example, be used.

Also provided in the basic body 80 is an air bleed opening 87, which, as the line connecting element 10 is screwed into the basic body 80, is covered by the sealing surface 13. In this way, the air bleed opening 87 is sealed off with respect to the pressure chamber 61 as a result of the screwing-in of the line connecting element 10 because the sealing surface 13 interacts with the seal element 83.

During the filling process, the line connecting element 10 is initially screwed into the basic body 80 only to such an extent that the colored O-ring 16 is still fully visible and a connection exists between the pressure chamber 61 and the air bleed opening 87. When hydraulic fluid emerges from the air bleed opening 87 in a bubble-free manner during the filling process, this is a sign that the system has been completely filled and bled. The line connecting element 10 can, therefore, be screwed further into the basic body 80 until the O-ring 16 is no longer visible and the sealing surface 13 interacts with the seal element 83 of the basic body 80 to seal off the air bleed opening 20. To prevent any hydraulic fluid still present in the air bleed opening from escaping, the air bleed opening can be closed off by a closure plug 20.

Should bleeding of the system be required after the filling of the system, the line connecting element 10 may be unscrewed from the basic body until the colored O-ring becomes visible. Subsequently, gas can be drawn out through the air bleed opening and/or hydraulic fluid can be filled in and/or hydraulic fluid can be introduced into the system at the slave side.

The air bleed opening 87 may for example have a cone, preferably a Luer cone, such that the air bleed opening 87 can be closed off with a commercially available closure plug 20.

The design of the air bleed opening 87 as a Luer cone has the further advantage that, during filling or bleeding, a commercially available syringe, for example, may be inserted into the air bleed opening in order, by suction, to assist the filling or bleeding of the hydraulic system. The use of a Luer cone for filling and bleeding open brake systems is described for example in the two German Published, Non-Prosecuted Patent Applications DE 10 2006 040 327 A1 and DE 10 2006 040 328 A1, the entire content of which is hereby incorporated by reference into the present application.

The master device has a grip span adjusting device 70.

The master device also has a lever 30 with an actuating section 31. The lever 30 is rotatably mounted on the basic body 80 via a thrust piece 40. For this purpose, the thrust piece 40 has a rotary bearing receptacle 42, in which a bearing journal 82 is received. The bearing journal 82 may be fastened to the basic body 80 in a manner known to a person skilled in the art, and may, for example, also be formed in one piece with the basic body 80.

In the non-actuated state of the master device, the thrust piece 40 bears with a stop 41 against a thrust piece stop 81 of the basic body 80.

To actuate the master device, the rider grips the actuating section 31 with his fingers and pulls or pushes the lever 30 in the direction of the handlebar tube (not illustrated) to which the master device is fastened.

To optimally adapt the master device to the rider, the grip span should be adjusted for the respective rider to allow for the different lengths of the fingers.

With the grip span adjusting device 70, the angle α between the lever 30 and the thrust piece 40 in relation to an axis of rotation about the bearing journal 82 can be adjusted.

In the case of the angle α, the direction 39 of the lever 30 has been assumed to be the direction of the actuating section 31 at which the driver acts on the lever during the actuation of the master device. The direction 49 of the thrust piece 40 has been defined as being parallel to the direction of the handlebar tube in the section to which the master device is attached. FIG. 1 shows the angle α between the lever 30 and thrust piece 40 in relation to the axis of rotation defined by the rotary bearing receptacle 42 or the bearing journal 82. Other definitions of the angle α are conceivable. It is important that the angle and, therefore, the distance between the actuating section 31 of the lever 30 and the handlebar tube can be adjusted.

The grip span adjusting device 70 has a bolt 71 which is screwed into the lever in a bore. At its end facing away from the handlebar tube, the bolt 71 has an engagement section 72, which, in an exemplary embodiment, is configured as a hexagonal socket. At its other end, the bolt 71 has a stop section 73, by which the bolt 71 is supported on a corresponding stop section 43 counter to the force of a preload device 74. To vary the grip span, the bolt 71 can simply be screwed in the bore formed in the lever, such that the angle α between the direction 39 of the lever 30 and the direction 49 of the thrust piece 40 changes, without influencing the position of the thrust piece 40.

The master device also has a pressure point adjusting and/or brake or clutch lining adjusting device 50. In the case of hydraulic brake systems, the pressure point adjusting and/or brake or clutch lining adjusting device 50 may, for example, be used to compensate wear of the brake linings. Correspondingly, in the case of clutch systems, wear of the clutch friction linings can be compensated.

A receptacle 44 for the pressure point adjusting and/or brake or clutch lining adjusting device 50 is provided in the thrust piece 40.

The pressure point adjusting and/or brake or clutch lining adjusting device 50 has a threaded bolt 51, which has an external thread and is disposed in a rotary receptacle 52 with an internal thread. The rotary receptacle 52 is rotatably held in the receptacle 44 of the thrust piece 40.

The threaded bolt 51 has a threaded bolt head 54, which engages into a corresponding bolt receptacle 64 of the piston 60. By rotating the threaded bolt 51 in the rotary receptacle 52, the threaded bolt 51 can be adjusted in the direction of the piston 60 such that the pressure point of the master device or the zero position of the master device can be varied. In this way, it is, for example, possible for the wear of brake or clutch linings to be compensated.

To actuate the pressure point adjusting and/or brake or clutch lining adjusting device 50, a rotary knob 53 is provided on that end of the threaded bolt 51 which is situated opposite the threaded bolt head 54.

The angle β between the direction of the threaded bolt 51 and the direction of the hydraulic cylinder 86 in relation to the point of engagement of the threaded bolt head 54 on the bolt receptacle 64 of the piston 60 varies during the actuation of the master device. In the case of the angle β, the direction of the threaded bolt 51 has been assumed to be the direction parallel to the longitudinal axis or the main axis of the threaded bolt. The direction of the hydraulic cylinder 86 is assumed to be the direction along the cylinder main axis or the direction in which the piston is movably disposed. The angle is defined in relation to the point of engagement of the threaded bolt head 54 on the bolt receptacle 64 of the piston 60.

Optimally, the angle β would always be approximately zero degrees during the actuation of the master device. This is not practically possible. Therefore, the angle β is set such that the angle β is small at the start of the actuation and becomes smaller, or falls to zero, during the actuation. The angle β may also point in the other direction at least within a short period of the actuation, that is to say, the direction 59 in FIG. 1 would be below the direction 89 and would point from bottom right to top left. At the end of the actuation, the angle β may become greater again or change its direction and then become greater again.

Since the grip span adjusting device leaves the position of the thrust piece 40 unchanged during an adjustment of the grip span, the angle β remains unchanged here.

To provide a connection of the master device to the outside, a grommet 90 is provided in the region of the line connecting element 10, which grommet 90 surrounds the hydraulic line 1 and the front region of the basic body 80. A covering hood 100 is provided in the rear region.

Figure 2:
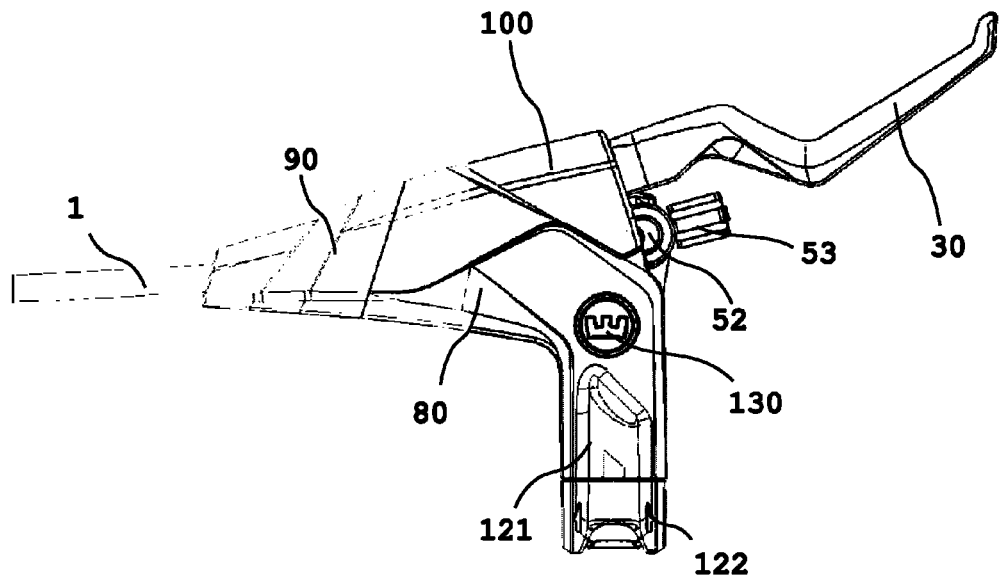
FIG. 2 is a top plan view of the master device of FIG. 1 from the outside.
Figure 3:
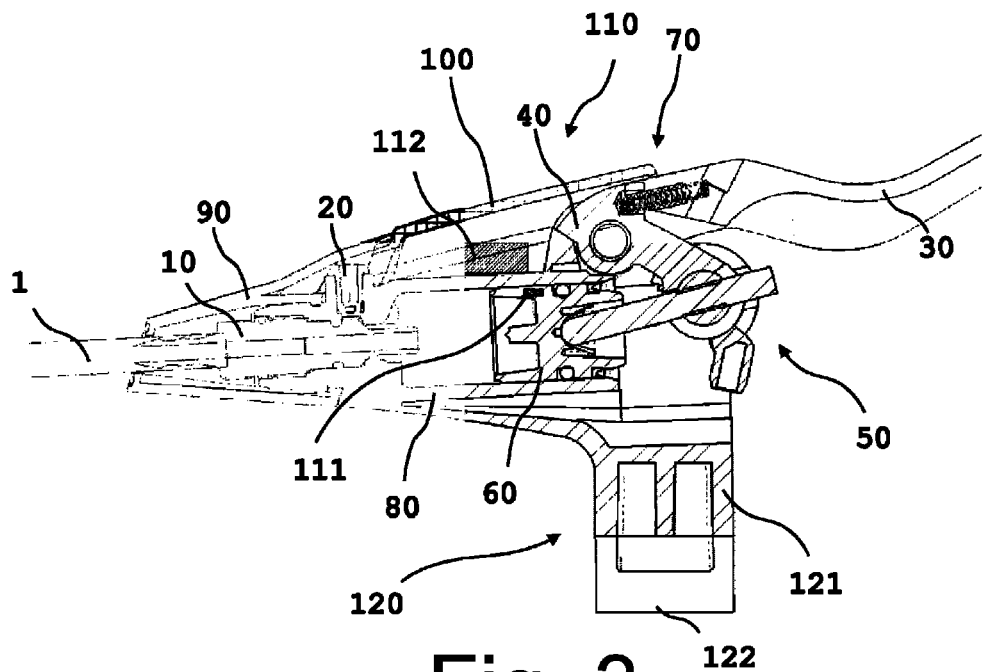
FIG. 3 is a cross-sectional view of a master device for a hydraulic brake system of handlebar-steered vehicles according to a further exemplary embodiment of the invention.
Figure 4:
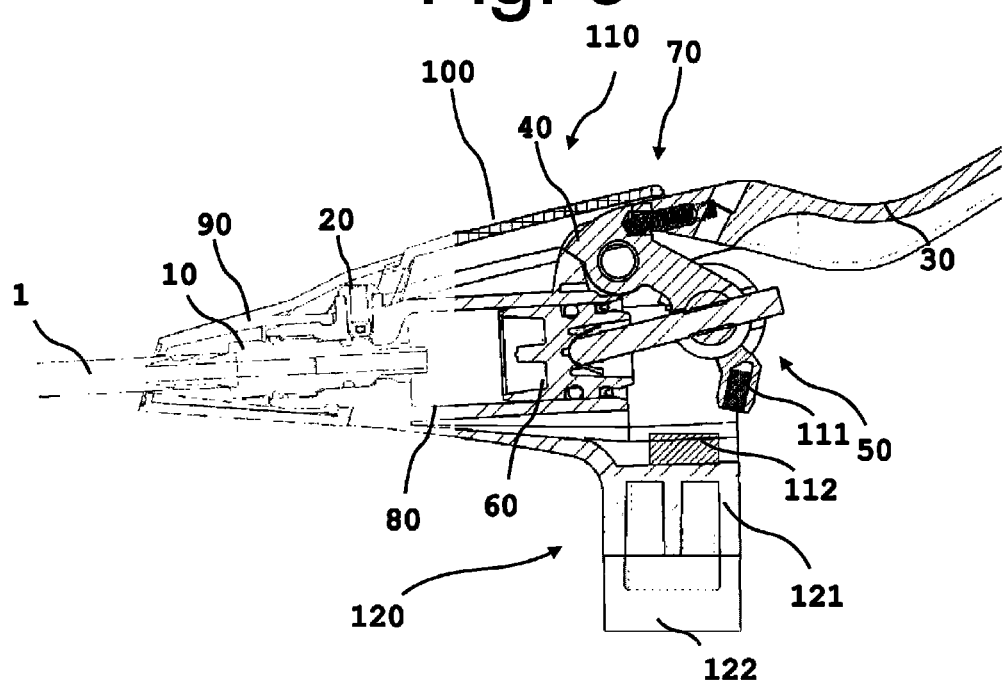
FIG. 4 is a cross-sectional view of a master device for a hydraulic brake system of handlebar-steered vehicles according to another exemplary embodiment of the invention.

The master device advantageously also has an actuation sensor device 110. The actuation sensor device 110 may, for example, comprise a magnet 111 and a Hall sensor 112, which detects when the magnet comes into the proximity of the Hall sensor, and thereby detects an actuation of the master device. Alternatively or in addition thereto, a reed contact may also be used. Possible locations for disposing the magnet/Hall sensor pairs are shown in FIGS. 3 and 4, which positions may be used alternatively or in any desired combination. Said figures are intended to show substantially only different arrangements of the actuation sensor device 110; reference is, therefore, made otherwise to the description in connection with FIGS. 1 and 2.

In embodiments in which the piston is not held in a non-rotatable manner in the cylinder chamber, circumferentially symmetrical signal transducers may also be provided, for example, two magnet half-shells or encircling magnets or other signal transducers or position transducers which are known to a person skilled in the art which are used for detecting positions.

According to the invention, an anti-rotation facility of the piston may also be configured to additionally prevent the piston from falling out of the cylinder chamber in which it is held.

According to the exemplary embodiment of FIG. 3, the magnet 111 could be disposed in the piston 60 and the Hall sensor 112 could be arranged disposed under the covering hood 100 outside the basic body 80.

According to the embodiment of FIG. 4, the magnet 111 could be provided in a projection of the thrust piece 40 and the Hall sensor 112 could be provided in the basic body 80 above the fastening device 120.

In the case of master devices for brake systems, the actuating signal could, for example, be used as a signal for switching on a brake light.

The master device also has a fastening device 120 having a handlebar tube fastening section 121 which can be fastened to the handlebar tube by means of a clamp 122. The handlebar tube fastening section 121 has an enclosure angle of approximately 185°. In this way, to mount the master device, it is possible simply to clamp the handlebar tube fastening section 121 onto the handlebar tube and to subsequently secure it using the clamp 122, which is fastened to the handlebar tube fastening section 121 for example by means of two screws which are arranged on opposite sides of the clamp 122 in relation to the handlebar tube. FIG. 1 shows a state before the connection of the handlebar tube fastening section 121 to the clamp 122, and FIG. 2 shows a state in which the clamp has been attached to the handlebar tube fastening section 121.

Also provided in the basic body 80 is a combined switching and display device 130. Alternatively, only a switching device or display device may be provided, or a plurality of devices may be provided for displaying and for switching respectively. It is, for example, possible for the selected spring characteristic of a spring fork to be switched and/or displayed.

Figure 5:
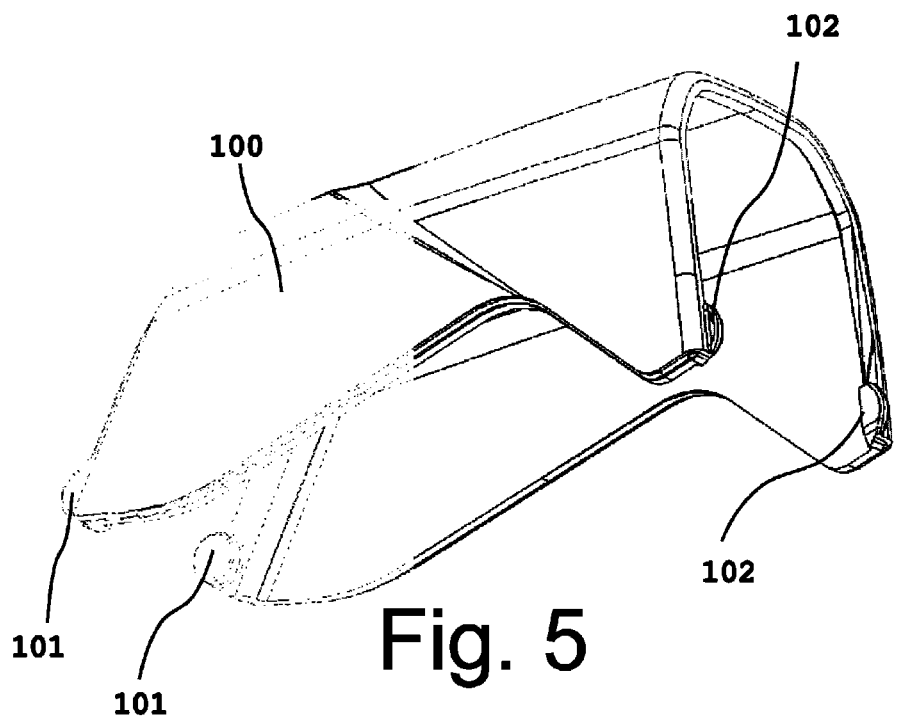
FIG. 5 is a perspective view of an exemplary embodiment of a covering hood for the system of FIG. 1.
Figure 6:
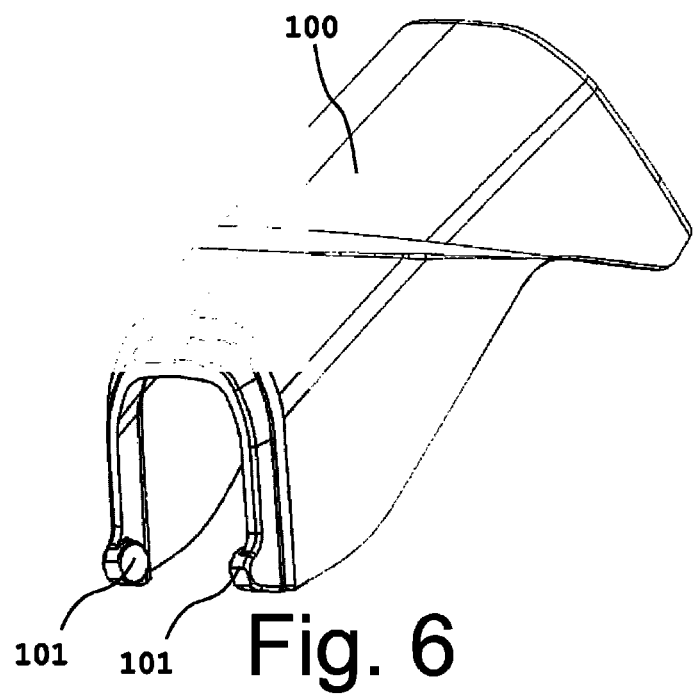
FIG. 6 is a perspective view of the covering hood of the exemplary embodiment of FIG. 5.

FIGS. 5 and 6 show the covering hood 100 of the embodiment according to the invention of FIG. 1 in detail. The covering hood 100 has two rotary joints 101 designed to be received in corresponding receptacles of the basic body 80 and/or of the grommet 90. Furthermore, at its opposite end, the covering hood 100 has two snap-action fastening elements 102, which engage into corresponding receptacles, which are provided, for example, on the basic body 80, during the mounting of the covering hood.

FIGS. 7 and 8 respectively show the basic body 80 with a hydraulic line connecting element 10 partially screwed in and with a hydraulic line connecting element fully screwed in. FIG. 7, therefore, shows the open position of the valve and FIG. 8 shows the closed position of the valve. In addition to FIG. 1, the restoring spring 62 and the seal 63 are illustrated.

FIGS. 9 and 10 show perspective cross-sectional views of the basic body 80, wherein in FIG. 9, the hydraulic connecting element has been omitted, and in FIG. 10, the hydraulic connecting element is shown in the fully screwed-in position (that is to say in the closed position of the valve).

It can be seen that the crown 65, as an additional securing measure for the closed position, engages behind a collar at the end of the projection 12 of the hydraulic line connecting element. The crown 65 functions as a travel delimitation for the projection 12 or the hydraulic line connecting element 10.

Figure 12:
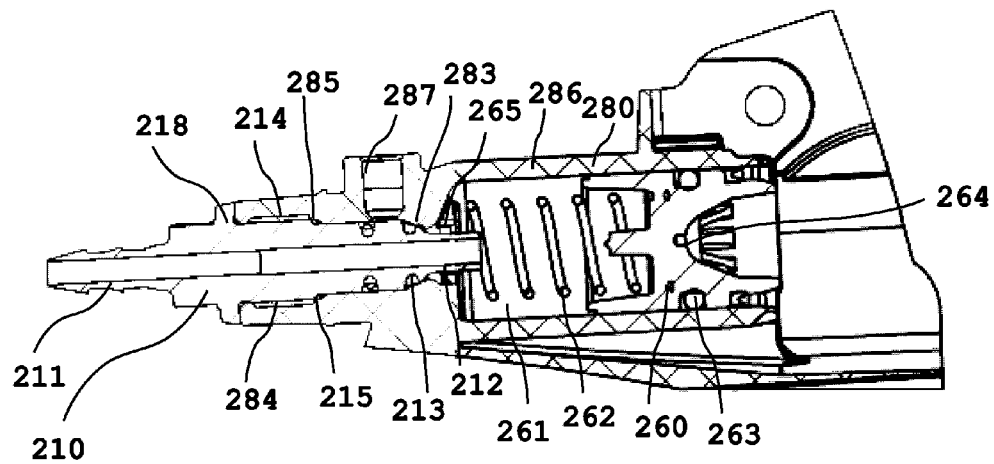
Figure 11:
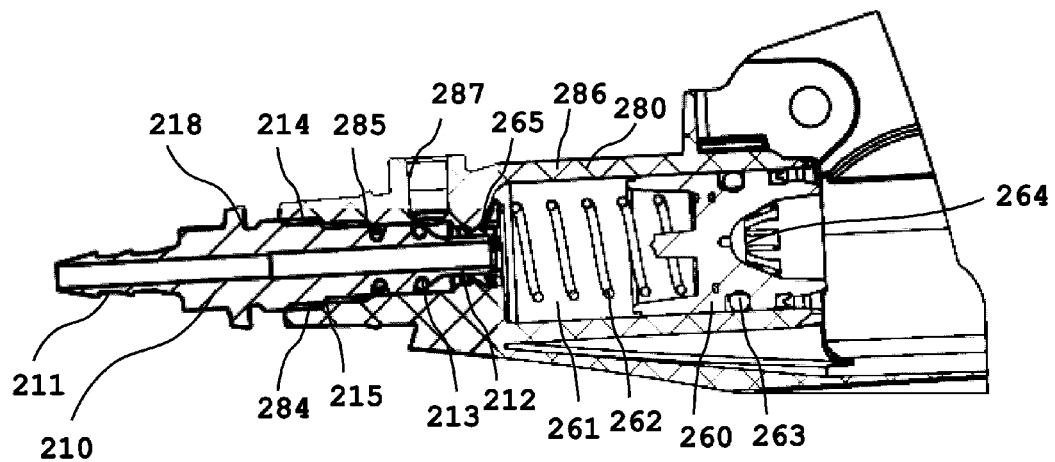

FIGS. 11 and 12 show a further exemplary embodiment of the invention which substantially corresponds to the embodiment shown inter alia in FIGS. 7 and 8. The corresponding parts are denoted by the same reference numerals, increased by the value of 200. Below, only the differences in relation to the embodiment of FIGS. 7 and 8 are described, and reference is otherwise made to the description said embodiment.

Instead of the seal surface 13 and the seal element 83 which interacts therewith (see FIGS. 7 and 8), the embodiment of the invention shown in FIGS. 11 and 12 has a seal 213 (for example, an O-ring) and a seal surface 283 that interacts therewith. The seal 213 forms, with the seal surface 283, a valve that is open in the position shown in FIG. 11, that is to say, opens up the connection between the air bleed opening 287 and the pressure chamber 261, and which is closed in the position shown in FIG. 12, that is to say, closes off the connection between the air bleed opening 287 and the pressure chamber 261.

The line connecting element 210 has a collar 218 which, in the position shown in FIG. 12, abuts against or adjoins the basic body 280. In this way, the abutment of the collar 218 against the basic body 280 prevents the hydraulic connecting element 210 from being screwed too far into the basic body 280.

It is clear that the scope of protection of the present application is also intended to encompass alternatives that are obvious to a person skilled in the art when studying the documents, and also equivalent solutions. For example, the plug 20 could be integrated in the grommet 90.

The invention, therefore, also relates to a master device, in particular, of a hydraulic bicycle wheel rim brake with a brake lining adjusting device and a grip span adjusting device that is independent thereof (that is to say, the adjustment of the grip span does not influence the setting of the linings) and also a thrust piece that is supported on the basic body of the master device and that supports the lever of the master device and holds a part of the brake lining adjusting device. Here, the grip span adjusting device defines a certain fixed angle between the lever and the thrust piece. The thrust piece and, therefore, the lever are rotatably mounted on the basic body of the master device. The brake lining adjustment may take place independently of the grip span adjustment because the adjustment of the grip span does not change the position of the thrust piece. The brake lining adjusting device advantageously engages on the brake lining adjusting device.

According to the invention, the brake lining adjusting device or the pressure point adjusting device may be actuated without the use of tools (in a tool-free manner).

The invention, therefore, also relates to a master device, in particular, of a hydraulic bicycle wheel rim brake having a grip span adjusting device and a lining adjusting and/or pressure point adjusting device that can be adjusted independently of said grip span adjusting device.

The invention, therefore, also relates to an actuating fitting, in particular, for hydraulic wheel rim brakes for a bicycle, having a fitting housing that has fastening measures for fastening the actuating fitting to a handlebar tube, a steering column or similar steering element of a handlebar-steered vehicle, having a hand lever rotatably mounted on the fitting housing, having a hydraulic force transmission device disposed on or in the fitting housing, and having a thrust piece having a common rotary bearing for the hand lever and the thrust piece. A grip span adjusting device is provided on the thrust piece and the hand lever (or between the thrust piece and the hand lever), and a lining adjusting and/or pressure point adjusting device is provided on the thrust piece and the hydraulic force transmission device (or between the thrust piece and the force transmission device). Said embodiment of the invention has the advantage that the grip span can be adjusted independently of the position of the lining or the pressure point of the system. In the zero position (non-actuated state), the thrust piece is supported on the housing and, thereby, defines a fixed initial position for the adjustment of the position of the lining or of the pressure point of the hydraulic force transmission system.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A master device for a closed hydraulic system of handlebar-steered vehicles having a slave device and containing hydraulic fluid, the master device comprising:
    a basic body defining a pressure chamber in which is disposed the hydraulic fluid placed under pressure during actuation of the master device in order to actuate the slave device;
    a lever operable to actuate the master device by placing the hydraulic fluid under pressure in the pressure chamber;
    a thrust piece rotatably mounting the lever to the basic body, the lever:
        having a grip span defined by an angle between the lever and the thrust piece; and
        being pivotable relative to the thrust piece;
    a grip span adjusting device connected at least to the basic body and operable to adjust the grip span of the lever; and
    an adjusting device operable to adjust a spacing between the thrust piece and the pressure chamber to at least one of:
        adjust a pressure point of the lever;
        compensate for wear of a brake lining; and
        compensate for wear of a clutch lining.

2. The master device according to claim 1, wherein:
    the thrust piece has a thrust stop section; and
    the grip span adjusting device has a bolt with a stop section operable to interact with the thrust stop section.

3. The master device according to claim 1, wherein the grip span adjusting device has an engagement section shaped to be engaged by a grip span adjustment tool.

4. The master device according to claim 2, wherein bolt has an engagement section shaped to be engaged by a grip span adjustment tool and to be adjusted thereby.

5. The master device according to claim 1, wherein:
    the lever has a pivoting path; and
    the grip span adjusting device has a preload device operable to preload the lever along the pivoting path in a direction of the thrust piece.

6. The master device according to claim 1, wherein:
    the thrust piece defines a receptacle; and
    the adjusting device has a bolt held in the receptacle, a relative position of the bolt in the receptacle being adjustable.

7. The master device according to claim 6, further comprising a rotary receptacle rotatably disposed in the receptacle of the thrust piece, the bolt being a threaded bolt rotatably disposed in the rotary receptacle.

8. The master device according to claim 6, wherein:
    the adjusting device is operable to at least one of:
        adjust a pressure point of the lever;
        compensate for wear of a brake lining; and
        compensate for wear of a clutch lining; and
    the bolt is held in the receptacle adjustably with regard to its relative position in the receptacle.

9. The master device according to claim 1, wherein:
    the thrust piece defines a receptacle; and
    the adjusting device has a bolt held in the receptacle, the adjusting device being operable to adjust a relative position of the bolt in the receptacle.

10. The master device according to claim 9, further comprising a rotary receptacle rotatably disposed in the receptacle of the thrust piece, the bolt being a threaded bolt rotatably disposed in the rotary receptacle.

11. The master device according to claim 9, wherein:
    the adjusting device is operable to at least one of:
        adjust a pressure point of the lever;
        compensate for wear of a brake lining; and
        compensate for wear of a clutch lining; and
    the bolt is held in the receptacle adjustably with regard to its relative position in the receptacle.

12. The master device according to claim 1, wherein the master device is a master device of at least one of:
    a hydraulic brake;
    a hydraulic bicycle brake;
    a hydraulic bicycle wheel rim brake;
    a hydraulic bicycle disc brake;
    a hydraulic clutch;
    a hydraulic electric bicycle brake;
    a bicycle;
    an electric bicycle; and
    a motorcycle.

* * * * *